(12) United States Patent
Sikora

(10) Patent No.: US 7,142,131 B2
(45) Date of Patent: Nov. 28, 2006

(54) METHOD AND APPARATUS FOR DISPLAYING AIRCRAFT ENGINE CHARACTERISTICS

(75) Inventor: Joseph A. Sikora, Seattle, WA (US)

(73) Assignee: The Boeing Company, Chicago, IL (US)

( * ) Notice: Subject to any disclaimer, the term of this patent is extended or adjusted under 35 U.S.C. 154(b) by 556 days.

(21) Appl. No.: 10/189,114

(22) Filed: Jul. 3, 2002

(65) Prior Publication Data

US 2004/0004557 A1 Jan. 8, 2004

(51) Int. Cl.
*G01C 21/00* (2006.01)

(52) U.S. Cl. .................... 340/971; 340/945; 340/963; 701/29

(58) Field of Classification Search ............... 340/971, 340/945, 963; 244/180, 195; 701/29
See application file for complete search history.

(56) References Cited

U.S. PATENT DOCUMENTS

| | | | |
|---|---|---|---|
| 3,191,147 A | 6/1965 | Majendie | |
| 4,196,474 A | 4/1980 | Buchanan et al. | |
| 4,212,064 A * | 7/1980 | Forsythe et al. | 701/29 |
| 4,247,843 A | 1/1981 | Miller | |
| 4,274,096 A | 6/1981 | Dennison | |
| 4,325,123 A | 4/1982 | Graham | |
| 4,792,906 A | 12/1988 | King | |
| 4,860,007 A | 8/1989 | Konicke | |
| 4,899,284 A | 2/1990 | Lewis | |
| 5,050,081 A * | 9/1991 | Abbott et al. | 701/14 |
| 5,070,458 A | 12/1991 | Gilmore et al. | |
| 5,329,277 A | 7/1994 | Dougan et al. | |
| 5,337,982 A | 8/1994 | Sherry | |
| 5,420,582 A | 5/1995 | Kubbat | |
| 5,454,074 A * | 9/1995 | Hartel et al. | 715/710 |
| 5,499,025 A | 3/1996 | Middleton et al. | |
| 5,668,542 A | 9/1997 | Wright | |
| 5,715,163 A | 2/1998 | Bang | |
| 5,739,769 A * | 4/1998 | Vladimir et al. | 340/945 |
| 5,844,503 A | 12/1998 | Riley et al. | |
| 5,875,998 A | 3/1999 | Gleine | |
| 5,940,013 A | 8/1999 | Vladimir et al. | |
| 5,978,715 A | 11/1999 | Briffe | |

(Continued)

FOREIGN PATENT DOCUMENTS

DE 3315386 A 10/1984

(Continued)

OTHER PUBLICATIONS

Presentation by Airbus Industries personnel on Jun. 10, 2002 (12 pages).

(Continued)

*Primary Examiner*—Toan N. Pham
(74) *Attorney, Agent, or Firm*—Perkins Coie LLP

(57) ABSTRACT

A method and system for displaying aircraft engine information. In one embodiment, the method includes directing the display of an icon that represents a qualitative, overall operational state of an aircraft engine, with the overall operational state being determined from a plurality of engine operating parameters. The method can further include directing a change in the display of the icon when the overall operational state of the aircraft engine changes from a first overall operational state to a second operational state. In a further aspect of this embodiment, the change in the characteristic of the icon can include a change in the color or other visual characteristic of the icon, and the color or other visual characteristic of the icon can correspond directly to instructions to the pilot for actions suggested or required as a result of the current engine operational state.

91 Claims, 4 Drawing Sheets

U.S. PATENT DOCUMENTS

| | | |
|---|---|---|
| 6,057,786 A | 5/2000 | Briffe |
| 6,085,129 A | 7/2000 | Schardt |
| 6,098,014 A | 8/2000 | Kranz |
| 6,112,141 A | 8/2000 | Briffe |
| 6,118,385 A | 9/2000 | Leard et al. |
| 6,188,937 B1 | 2/2001 | Sherry |
| 6,246,320 B1 | 6/2001 | Monroe |
| 6,262,720 B1 * | 7/2001 | Jeffrey et al. ............... 715/710 |
| 6,278,913 B1 | 8/2001 | Jiang |
| 6,314,366 B1 | 11/2001 | Farmakis et al. |
| 6,346,892 B1 | 2/2002 | DeMers et al. |
| 6,362,750 B1 | 3/2002 | Castor |
| 6,381,519 B1 | 4/2002 | Snyder |
| 6,389,333 B1 | 5/2002 | Hansman |
| 6,443,399 B1 | 9/2002 | Yount et al. |
| 6,542,796 B1 | 4/2003 | Gibbs et al. |
| 6,556,902 B1 * | 4/2003 | Ing et al. ...................... 701/29 |
| 6,636,786 B1 | 10/2003 | Partel |
| 6,697,718 B1 | 2/2004 | Le Draoullec et al. |
| 6,720,891 B1 | 4/2004 | Chen |
| 6,745,113 B1 | 6/2004 | Griffin |
| 6,753,891 B1 | 6/2004 | Chohan et al. |
| 2002/0016654 A1 | 2/2002 | Ing et al. |
| 2002/0033837 A1 | 3/2002 | Munro |
| 2003/0058134 A1 | 3/2003 | Sherry |
| 2003/0132860 A1 | 7/2003 | Feyereisen |
| 2004/0059474 A1 | 3/2004 | Boorman |
| 2004/0183697 A1 | 9/2004 | Rogers et al. |
| 2004/0254691 A1 | 12/2004 | Subelet |
| 2006/0004496 A1 | 1/2006 | Tucker et al. |

FOREIGN PATENT DOCUMENTS

| | | |
|---|---|---|
| EP | 0 286 120 | 10/1988 |
| EP | 0 370 640 | 5/1990 |
| EP | 0 489 521 | 6/1992 |
| FR | 21848306 | 3/2002 |
| FR | 2817831 | 6/2002 |
| GB | 886136 | 1/1962 |
| WO | WO-02/24530 | 3/2002 |

OTHER PUBLICATIONS

Peugeot 406 Handbook, Automobiles Peugeot, Paris, France, May 14, 1998 (pp. 30 and 38).

European Search Report for European Patent Application No. EP 03 07 7100, The Boeing Company, Oct. 28, 2003 (2 pages).

U.S. Appl. No. 10/746,883, Boorman.

U.S. Appl. No. 10/746,912, Boorman.

U.S. Appl. No. 10/787,644, Tafs et al.

U.S. Appl. No. 10/798,749, Sandell et al.

U.S. Appl. No. 10/814,369, Chen et al.

U.S. Appl. No. 10/814,494, Gunn et al.

U.S. Appl. No. 10/815,034, Crane et al.

777 Flight Deck (1 page); http://www.meriweather.com/777/777_main.html; [Accessed Jan. 28, 2003].

Hutchins, Edwin, "The Integrated Mode Management Interface," Department of Cognitive Science, University of California, San Diego, Sep. 17, 1996.

Lindenfeld, Ron, "What is an FMS?", Flight Management Systems (5 pages); http://www.ultranet.com/~marzgold//FAQ-FMS.html; [Accessed Jun. 3, 2002].

Meriweather's Flight Deck Acronyms & Definitions (4 pages); http://www.meriweather.com/fd/def.html; [Accessed Jun. 3, 2002].

U.S. Appl. No. 10/860,760, Sikora et al.

* cited by examiner

METHOD AND APPARATUS FOR DISPLAYING AIRCRAFT ENGINE CHARACTERISTICS

TECHNICAL FIELD

The present invention relates generally to methods and systems for displaying aircraft engine characteristics, such as the operational state of the engines, to the flight crew of the airplane.

BACKGROUND

Modern aircraft engine flight deck displays typically include computer-driven display screens dedicated to presenting engine status information. These display screens typically present to the pilots engine data indicating the values of a variety of engine operating parameters. For example, the display screens can present a primary engine display 111 (shown in FIG. 1A) and a secondary engine display 112 (shown in FIG. 1B). The primary engine display 111 can present top-level engine parameter data, such as exhaust pressure ratio (EPR) at an EPR display 113a, low pressure compressor shaft rotation speed (N1) at an N1 display 113b, and exhaust gas temperature (EGT) at an EGT display 113c. The primary engine display 111 can include multiple sets of displays 113a–c (two are shown in FIG. 1A), one set for each engine of the aircraft.

The secondary engine display 112 can include information corresponding to other engine operating parameters. For example, the secondary engine display 112 shown in FIG. 1B can include intermediate compressor shaft rotation speed (N2) at an N2 display 113d, high pressure compressor shaft rotation speed (N3) at an N3 display 113d, fuel flow at a fuel flow display 113f, oil pressure at an oil pressure display 113g, oil temperature at an oil temperature display 113h, oil quantity at an oil quantity display 113i, and engine vibration at an engine vibration display 113j.

One characteristic associated with the foregoing approaches for displaying engine data is that the pilot or other crew member operating the aircraft must be able to quickly view the data, integrate and interpret the data, and determine whether the data warrant an action on the part of the crew. If an action is required, in many cases, the pilot must determine what the action is. One drawback with this approach is that it can be time-consuming and costly to train pilots to quickly and efficiently carry out the foregoing steps.

One approach to addressing the foregoing problem is to display engine thrust, as well as other engine operating parameters, in a color coded manner that indicates when the thrust or other parameters exceed predetermined limits. One such method is disclosed in U.S. Pat. No. 5,050,081 to Abbott et al. However, this approach may also suffer from some of the foregoing drawbacks, namely, that presenting pilots with a plurality of parameter information still requires them to integrate and interpret the information. Also it may still be time-consuming to train pilots to understand the information presented to them, and it may take time to train the pilots to understand what action is required based on the data they see.

SUMMARY

The present invention is directed toward a computer-implemented method and system for displaying aircraft information. In one aspect of the invention, the method includes directing the display of an icon that represents a qualitative, overall operational state of an aircraft engine, with the overall operational state being determined from a plurality of engine operating parameters. The method can further include directing a change in the display of the icon when the overall operational state of the aircraft engine changes from a first overall operational state to a second overall operational state. For example, the method can include displaying an icon having a shape representative of an aircraft engine, and can further include changing a color of the icon as the overall operational state of the engine changes.

In another aspect of the invention, the method can include directing a display of a first visual cue corresponding to a first pilot instruction when the overall operational state of the aircraft engine is the first overall operational state, and directing a display of a second visual cue corresponding to a second pilot instruction when the overall operational state of the aircraft engine is the second overall operational state, with the second pilot instruction being different than the first pilot instruction. For example, the method can include directing the display of the icon to have a first color (such as amber) when the overall operational state of the engine is such that the power to the engine should be reduced. The color of the icon can be changed to a second color (such as red) when the overall operational state of the engine is such that the engine should be shut down.

In another aspect of the invention, a computer system for displaying information corresponding to the operation of an aircraft engine includes a determining component with contents capable of determining a qualitative overall operational state of the aircraft engine based on a plurality of engine operating parameters. The computer system can further include a display component with contents capable of displaying an icon indicating the overall operational state of the aircraft engine and changing a characteristic of the icon when the overall operational state of the aircraft engine changes from a first overall operational state to a second overall operational state.

DETAILED DESCRIPTION

The present disclosure describes methods and systems for displaying aircraft engine characteristics. Many specific details of certain embodiments of the invention are set forth in the following description and in FIGS. 2–5 to provide a thorough understanding of these embodiments. One skilled in the art, however, will understand that the present invention may have additional embodiments, and that the invention may be practiced without several of the details described below.

Figure 1A:
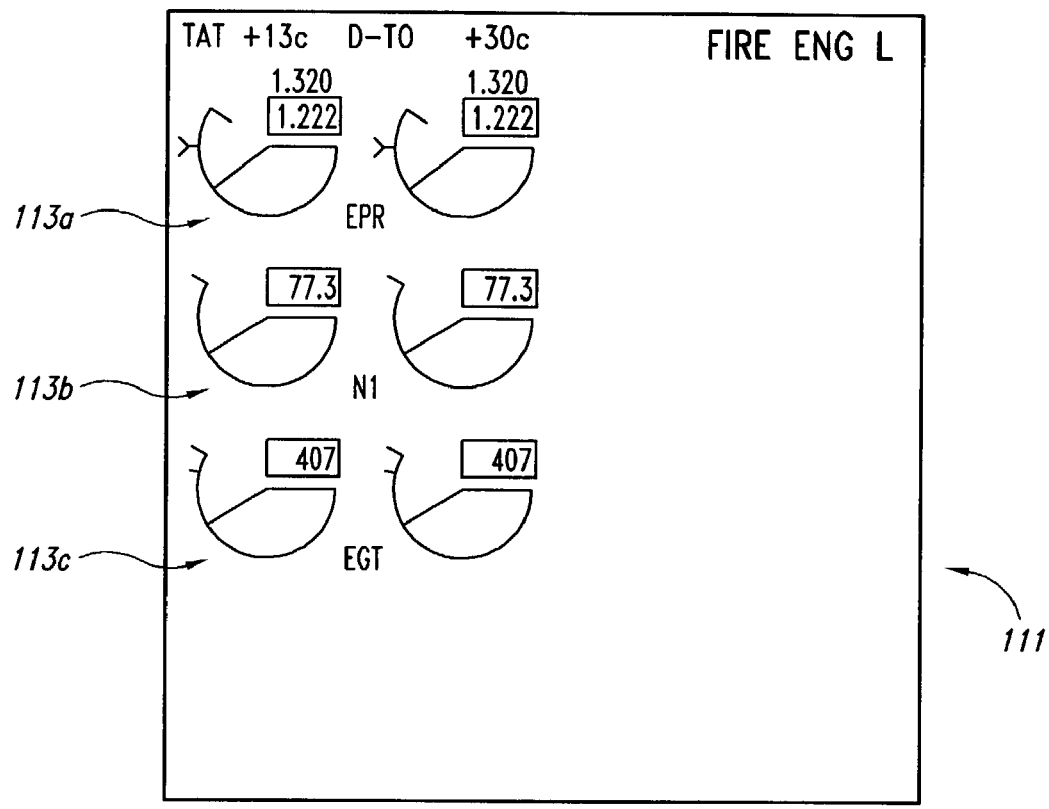
FIGS. 1A–1B illustrate engine flight deck displays in accordance with the prior art.
Figure 1B:
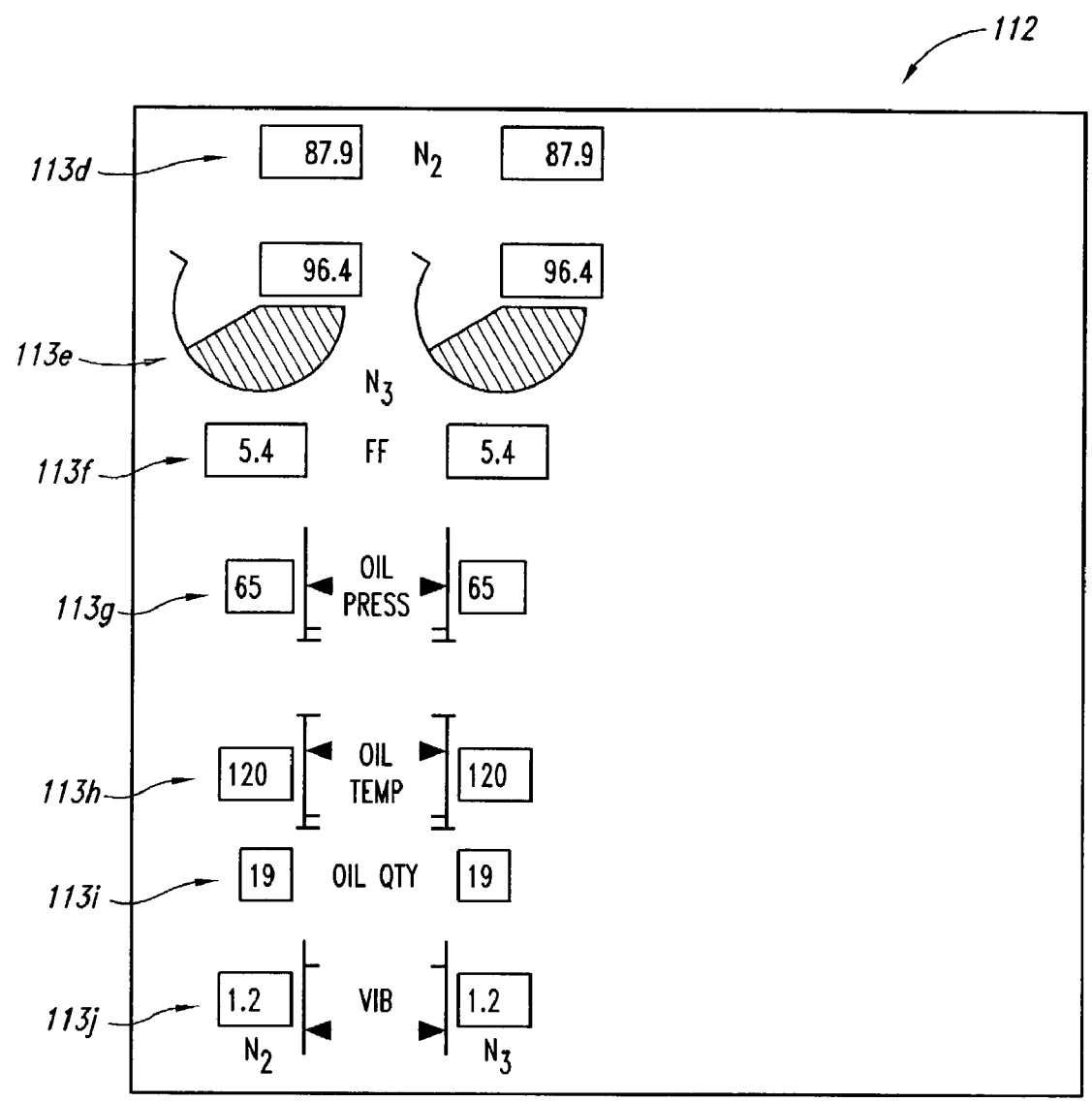
Figure 2:
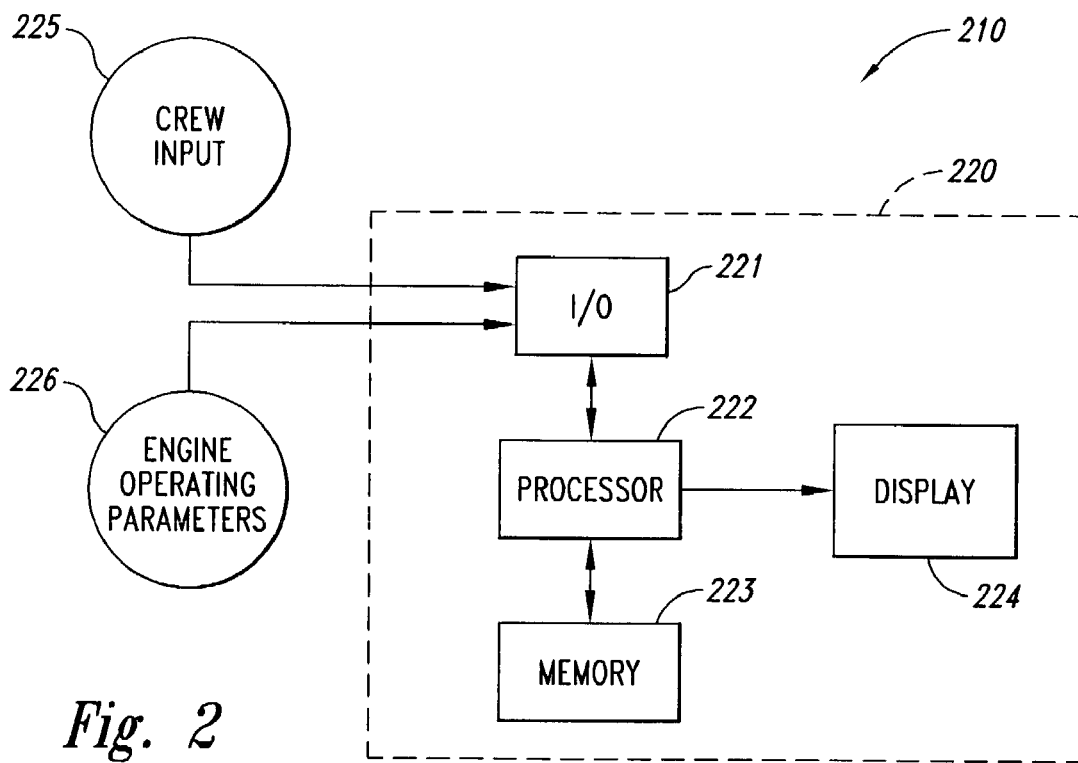
FIG. 2 is a schematic illustration of a system for displaying aircraft engine characteristics in accordance with an embodiment of the invention.

FIG. 2 is a schematic block diagram illustrating a system 210 that displays the state of one or more aircraft engines in accordance with an embodiment of the invention. In one aspect of this embodiment, the system 210 can include a computer 220 having one or more input/output devices 221, a processor 222, a memory 223, and a display unit 224. In other embodiments, the functions carried out by the system 210 can be distributed over a plurality of computers or processing platforms. In any of these embodiments, the input/output devices 221 can receive signals corresponding to engine operating parameter signals 226, and, optionally, crew input signals 225. The processor 222 can determine the overall operational state of each engine, based at least in part on one or more of the engine operating parameter signals 226. The processor 222 can then direct the display of an icon on the display unit 224 that qualitatively indicates the overall operational state of the engine and, optionally, a visual cue that indicates to the pilot (a) whether an action is required and if so, (b) what the action should be.

In one embodiment, the computer 220 can be generally similar to existing avionics computers, but can be programmed and/or configured to carry out the foregoing processes. For example, the computer 220 can include an engine controller computer (EEC or FADEC) and/or an aircraft display computer. In any of these embodiments, one or more of the input/output devices 221 can be configured to receive the engine operating parameter signals 226 directly from the aircraft engines and/or from intermediate computers or processors. One or more of the input/output devices 221 can be configured to receive the crew input signals 225 and can accordingly include a keypad, mouse pad, touch screen, or other such device. The crew input signals 225 can be used to tailor certain aspects of the manner in which information is presented on the display 224, or obtain additional information, without affecting the content of the information. One or more of the input/output devices 221 can also be configured to access a computer-readable medium (such as a CD or diskette). Directions for carrying out processes in accordance with embodiments of the invention can be stored on such media, and/or in the memory 223. The display 224 on which the information is presented can include a CRT screen, an LCD screen, or any other device that is configured to present engine-related information to the crew.

Figure 3:
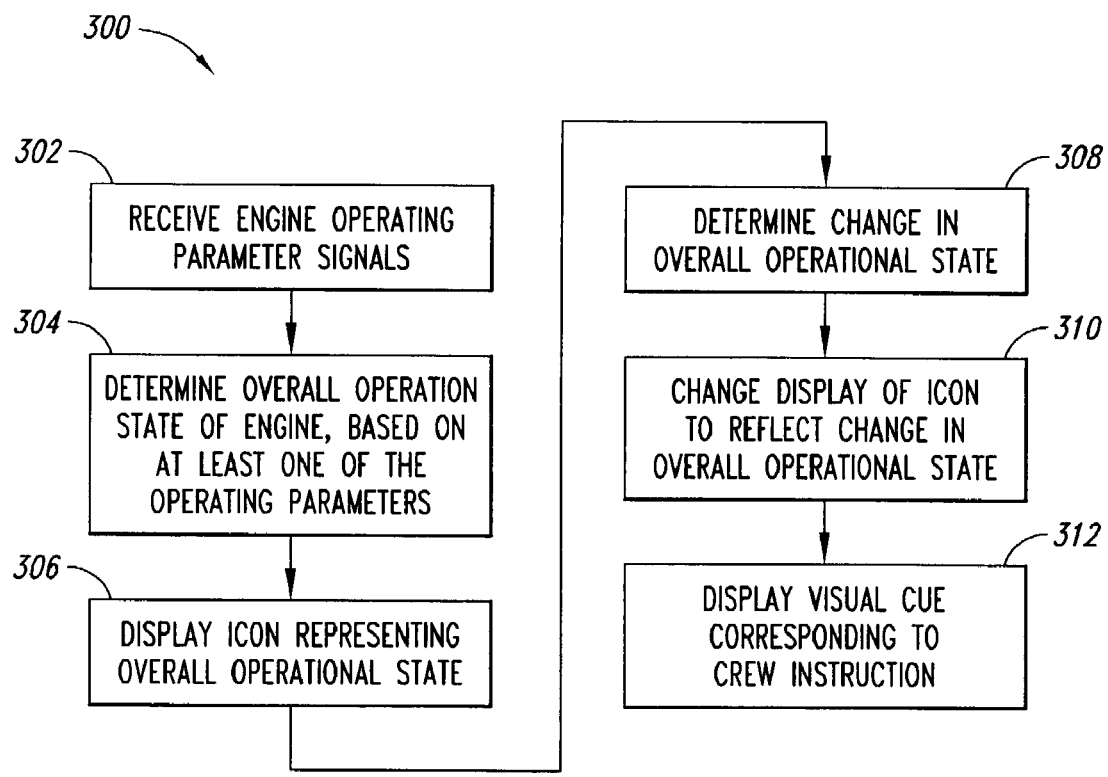
FIG. 3 is a flow diagram illustrating a process for displaying aircraft engine characteristics in accordance with an embodiment of the invention.

FIG. 3 is a flow diagram illustrating a process 300 for presenting aircraft engine information to the crew. The process 300 includes receiving engine operating parameter signals (process portion 302). The overall operational state of the engine is then determined, based on at least one of the operating parameters (process portion 304). In one embodiment, the overall operational state of the engine can be selected from one or more pre-established states. For example, the pre-established states can include states for which (a) the engine is shut down, (b) the engine is operating normally, (c) the engine is running and is operating with a malfunction or condition that requires the pilot to reduce the engine power level, and (d) the engine is running and operating with a malfunction or condition that requires the pilot to shut the engine down. In other embodiments, the pre-established states can include a state in which the engine is starting up, a state in which the engine has been shut down normally and is available for restart, and/or a state in which the engine has been shut down in an emergency procedure and/or is unavailable for restart.

In process portion 306, an icon is displayed representing the overall operational state of the engine. The process 300 can further include determining a change in the overall operational state (process portion 308) and changing the display of the icon to reflect changes in the overall operational state (process portion 310). The process 300 can further include displaying one or more visual cues corresponding to a pilot instruction that is based on the operational state of the engine (process portion 312). Further details of the content and manner in which the engine-related information is displayed are provided below with reference to FIGS. 4 and 5.

Figure 4:
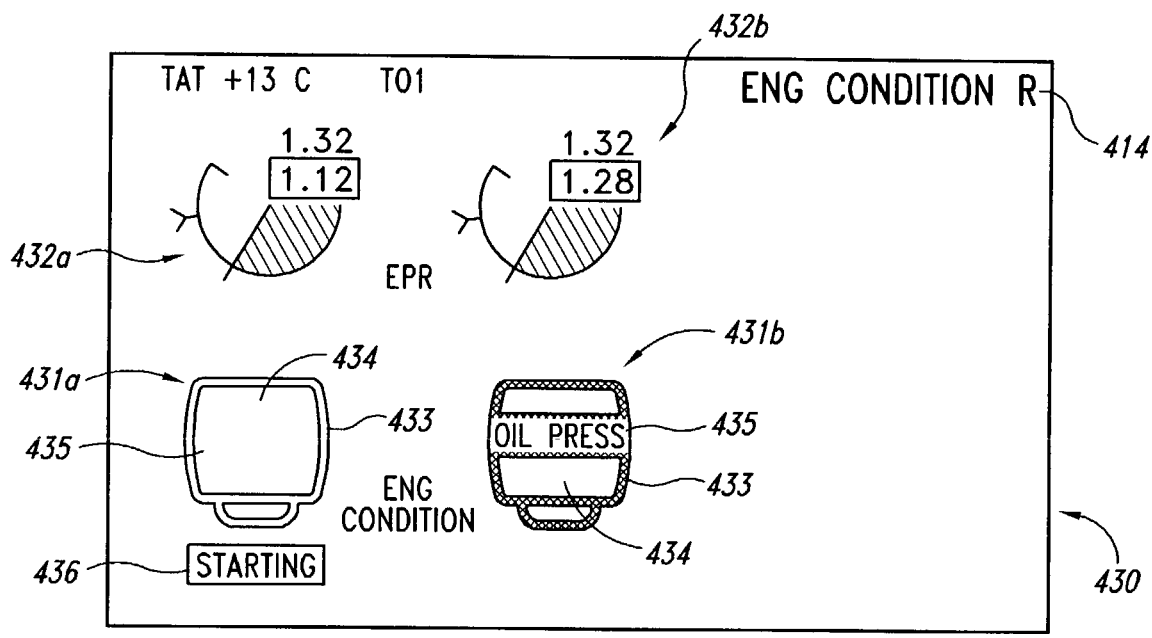
FIG. 4 illustrates a display for presenting aircraft engine states and pilot instruction cues in accordance with an embodiment of the invention.

FIG. 4 illustrates a display 430 suitable for presentation on the display device 224 (FIG. 2) in accordance with an embodiment of the invention. In one aspect of this embodiment, the display 430 presents one or more icons 431 (two are shown in FIG. 4 as a first or left icon 431a and a second or right icon 431b). In one embodiment, each icon 431 can include an outline 433 having a shape that is roughly representative of an aircraft engine. In other embodiments, the icons 431 can have other shapes, such as those described below with reference to FIG. 5. In any of these embodiments, each icon 431 represents a qualitative, overall operational state of the corresponding aircraft engine, such as the states described above with reference to FIG. 3. The overall operational state is a level of abstraction beyond engine operating parameters (such as N1, EPR, or EGT) and quantities calculated from the engine operating parameters (such as engine thrust).

In another aspect of an embodiment shown in FIG. 4, a characteristic of the icon 431 can indicate the present state of the aircraft engine and can change to indicate a change in state of the aircraft engine while the overall size of the icon 431 and its position on the display 430 remains constant. For example, in one embodiment, the color of the outline 433 can represent the present state of the aircraft engine, and can change as the state of the aircraft engine changes. In one aspect of this embodiment, the outline 433 can be white when the aircraft engine is not running. If the aircraft engine is operating normally, the outline 433 can shift to green.

The characteristic of the icon 431 can indicate not only the state of the aircraft but whether the engine requires pilot or other crew intervention, and if so, what that intervention should be. For example, if the aircraft engine is operating with a condition or malfunction that requires the thrust of the engine to be reduced, the color of the outline 433 can be amber. If the aircraft engine is operating at a condition or with a malfunction that warrants or requires the engine to be shut down, the color of the outline 433 can be red. In other embodiments, other colors can indicate these or other overall engine states. In any of these embodiments, the color of the outline 433 not only indicates the state of the aircraft engine, but also provides a clear visual cue to the operator as to what type of action is required as a result of the engine state.

In other embodiments, other characteristics of the icon 431 can change as the overall operational state of the aircraft engine changes. For example, in one embodiment, the line thickness of the outline 433 can change in addition to or in lieu of changing the color of the outline 433. In another embodiment, an internal region 434 defined by the outline 433 can change in color, shading or other easily viewed aspects again, in addition to or in lieu of changing the color of the outline 433. In other embodiments, other characteristics of the icon 431 can change to indicate the change in state.

In still further embodiments, the display 430 can include information in addition to that described above. For example, the icons 431 can include an operating parameter display 435 that is blank when the engine is shut down, starting, or operating normally (as indicated by icon 431a). When the engine is not operating normally, the operating parameter display 435 can indicate the one or more engine operating parameters that precipitated the need for operator intervention. For example, (as shown in FIG. 4), the second icon 431b has an operating parameter display 435 that presents the text "OIL PRESS", which indicates that an oil pressure reading outside a selected range precipitated the change in color of the icon 431b to amber or red. In one embodiment, the determination to present the icon 431 with a particular characteristic can be based upon all the evaluated engine operating parameters being within corresponding selected ranges (for example, when the engine is operating normally), or any one of the engine operating parameters being outside the corresponding selected range (for example, if the engine power is to be reduced or halted). In another embodiment, this determination can require more than one engine operating parameter to be out of range.

In one embodiment, the corresponding range can refer to a range of values for a single engine operating parameter (e.g., EGT); in other embodiments, the corresponding range can refer to a rate of change of an engine operating parameter, a relationship (such as a ratio) of one engine operating parameter to another, or other algorithms that operate on one or more engine operating parameters. These algorithms can be used to detect engine operating conditions, such as an engine surge condition, which can be based on, among other parameters, combuster burner pressure. In any of these embodiments, if more than one engine operating parameter or condition dictates the characteristic with which the icon 431 is displayed, all such engine operating parameters or conditions can be displayed at the operating display 435. Alternatively, less than all the out-of-range engine operating parameters can be displayed at the operating display 435.

The display 430 can further include a state indicator text field 436 that indicates, with text, the state of the aircraft engine and/or a characteristic of the state. For example, the state indicator text display 436 can indicate that the corresponding left engine is not yet running (consistent with the white outline 433 of the icon 431a) and furthermore, that the left engine is in the process of starting. In other embodiments, the state indicator text field 436 can describe, in text, other characteristics of the overall operational state of the aircraft engine.

The display 430 can also include thrust indicators 432, such as EPR (shown as a first or left thrust indicator 432a and a second or right thrust indicator 423b). The thrust indicators 432 can graphically depict the thrust level produced by the corresponding engine, (and/or an engine operating parameter representative of thrust), along with a numerical representation of the thrust level, and an indicator of any limits associated with the thrust level. The display 430 can also include an alert 414 (such as an EICAS alert on Boeing models) that presents a textual message for the pilot providing further details of a condition that may warrant or require operator action.

One feature of an embodiment of the system 210 described above with reference to FIGS. 2–4 is that the icon 431 presents to the pilot or other operator a qualitative, high-level indication of the operational state of the aircraft engine or engines. An advantage of this feature is that the pilot need not integrate and interpret a variety of engine parameters to determine the operational state of the engine, but can instead understand with only a glance what the operational state of the engine is. For example, the pilot can tell at a glance that a particular engine is operating normally or abnormally without checking to see that each of a variety of engine parameters are within normal limits.

Another feature of an embodiment of the system 210 described above with reference to FIGS. 2–4 is that the overall operational state of the corresponding aircraft engine can be determined on the basis of a plurality of engine operating parameters. An advantage of this feature is that the determination of the state can be less likely to be incorrect because it includes an evaluation and/or synthesis of several engine parameters. For example, an indication that the engine is operating normally can be based on a determination that all the engine operating parameters are within an acceptable range of values and a determination that the engine is operating improperly can be based on a determination that any one of the operating parameters is outside the relevant acceptable range of values.

Still another feature of an embodiment of the system 210 described above with reference to FIGS. 2–4 is that one or more characteristics of the icon 431 can change as the overall operational state of the corresponding aircraft engine changes. The change in the characteristic of the icon 431 provides a clear visual cue to the pilot that the operational state of the engine has changed. Accordingly, the pilot need not look at, integrate and interpret one or more displays to determine when the display indicates a change in state, but can instead tell immediately by glancing at the display 430 that the state of the aircraft engine has changed.

Yet another feature of an embodiment of the system 210 described above with reference to FIGS. 2–4 is that for at least some operational states, the characteristic of the icon 431 can correspond directly to recommended and/or necessary pilot actions. Accordingly, the pilot need not recall the specific action required by the engine's state, or refer to a manual to determine what to do in response to the engine state, but can instead recognize immediately upon viewing the display 430 what action is required. For example, if the icon 431 is displayed in amber, the pilot can immediately recognize that power to the corresponding engine should be reduced, regardless of which engine operating parameter(s) triggered the indication. If after reducing power, the icon 431 turns green, the pilot can immediately recognize that the corresponding engine is now operating within normal limits. If despite one or more power reductions, the icon turns red, the pilot can immediately recognize that the corresponding engine should be shut down, again, regardless of which engine operating parameter(s) triggered the indication.

Of course, if the pilot wishes to obtain further information about specific engine operating parameters, he or she can receive the information either from the display 430, e.g. via the operating parameter display 435, or via other conventional displays, such as a secondary engine display. In other embodiments, the pilot can query the computer 220 (FIG. 2) with an input signal 225 (FIG. 2) to obtain further information. For example, the pilot can align a cursor with the icon with the icon 431 and click a mouse key, or select some other input key to obtain parameter data for the corresponding engine.

Figure 5:
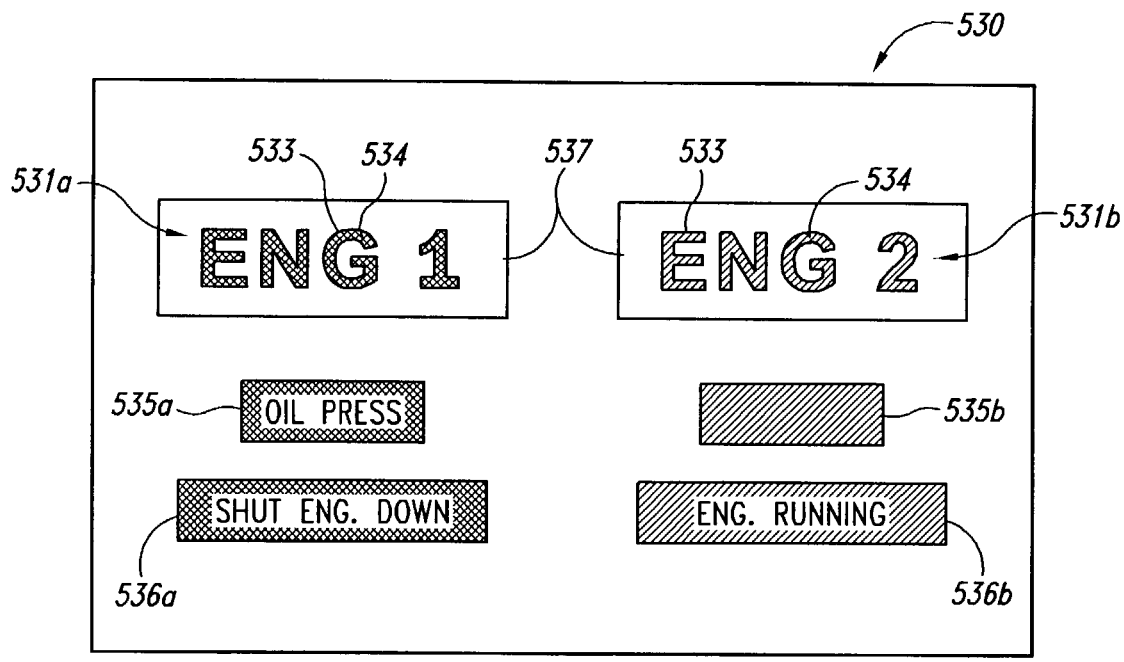
FIG. 5 illustrates a display for presenting aircraft engine states and pilot instruction cues in accordance with another embodiment of the invention.

FIG. 5 is a partially schematic illustration of a display 530 configured in accordance with another embodiment of the invention. In one aspect of this embodiment, the display 530 includes two icons 531 (shown as a first or left icon 531a and a second or right icon 531b) that indicate the overall operational state of the corresponding aircraft engines. In a further aspect of this embodiment, the icons 531 have the form of text characters. In other embodiments, the icons 531 can have other shapes and/or formats. In any of these embodiments, characteristics of the icons 531 can indicate the state of the corresponding aircraft engine and can change when the state of the corresponding aircraft engine changes. For example, each icon 531 can have an outline 533 that changes in color, thickness, and/or intensity. In another embodiment, each icon 531 can include an interior region 534 that changes color when the state of the corresponding aircraft engine changes. In still another embodiment, each icon can be presented against a background field 537, and the background field can change in color or another characteristic as the state of the corresponding engine changes.

The display 530 can further include additional information regarding details of the aircraft engine operation. For example, the display 530 can include operating parameter displays 535 (shown in FIG. 5 as operating parameter displays 535*a* and 535*b*) that indicate which engine operating parameter, if any, precipitated the overall operational state indicated by the icon 531. The display 530 can further include state indicator text fields 536 (shown as fields 536*a* and 536*b*) for each icon 531 which indicate, via text, further details of the corresponding engine state. For example, if the state of the engine represented by the first icon 531*a* is such that the pilot should shut the engine down, the text field 536*a* can include a message indicating that the pilot should shut the engine down. This message, along with the operating parameter display 535*a* and the icon 531*a* can all share the same visual characteristic. For example, if the icon 531*a* is displayed in red, the corresponding operating parameter display 535*a* and state indicator text field 536*a* can also be displayed in red. If the corresponding engine is operating normally (for example, as indicated by the second icon 531*b*) the corresponding operating parameter display 535*b* can be blank, and the corresponding state indicator text field 536*b* can indicate that the engine is running. The second icon 531*b* and the corresponding operating parameter display 535*b* and state indicator text field 536*b* can all share the same characteristic, such as a green display color.

In other embodiments, the characteristics of the icons 531*a* and/or the operating parameter displays 535 and/or the state indicator text fields 536 can have other characteristics that reflect the current overall operational state of the corresponding engine, and provide an indicator for pilot action, if such is required. For example, in one embodiment, the icon 531*a* and associated display fields can be constantly illuminated when the engines are shut down or running normally. These fields can blink at a relatively slow rate when the pilot is required to reduce power to the corresponding engine, and can blink at a more rapid rate when the pilot is required to shut the engine down. These characteristics of the icon and associated display elements can be employed in addition to or in lieu of the color change characteristic described above. In other embodiments, other characteristics of the icon and associated display fields can reflect the current state of the corresponding engine and any action required by the pilot based on the current state.

From the foregoing, it will be appreciated that specific embodiments of the invention have been described herein for purposes of illustration, but that various modifications may be made without deviating from the spirit and scope of the invention. Accordingly, the invention is not limited except as by the appended claims.

I claim:

1. A computer-implemented method for displaying aircraft engine information, comprising:
   directing the display of an icon that represents a qualitative, overall operational state of an aircraft engine, the overall operational state being determined from a plurality of engine operating parameters; and
   directing a change in the display of the icon when the overall operational state of the aircraft engine changes from a first overall operational state to a second overall operational state.

2. The method of claim 1, further comprising:
   receiving a plurality of signals corresponding to the plurality of engine operating parameters; and
   determining the overall operational state of the aircraft engine based at least in part on the plurality of signals.

3. The method of claim 1, further comprising:
   receiving a plurality of signals corresponding to the plurality of engine operating parameters;
   if all the engine operating parameters are within corresponding ranges, determining that the overall operational state of the aircraft engine is the first overall operational state; and
   if fewer than all the engine operating parameters are within the corresponding ranges, determining that the overall operational state of the aircraft engine is the second overall operational state.

4. The method of claim 1, further comprising determining the overall operational state of the aircraft engine from the plurality of engine operating parameters, wherein the plurality of engine operating parameters is selected from engine rpm, thrust, exhaust pressure ratio, exhaust gas temperature, oil pressure, oil temperature, oil quantity, fuel flow, combuster burner pressure and vibration.

5. The method of claim 1 wherein directing a change in the display includes directing a change in the display when the overall operational state changes from a first overall operational state in which the engine is operating within at least one parameter range to a second overall operational state in which the engine is operating outside the at least one parameter range.

6. The method of claim 1, further comprising directing a display corresponding to pilot instructions based at least in part on the overall operational state of the aircraft engine.

7. The method of claim 1, further comprising:
   directing a display corresponding to a first pilot instruction when the overall operational state of the aircraft engine is the first overall operational state; and
   directing a display corresponding to a second pilot instruction when the overall operational state of the aircraft engine is the second overall operational state, the second pilot instruction being different than the first pilot instruction.

8. The method of claim 1, further comprising:
   directing a display of a first visual cue corresponding to a first pilot instruction when the overall operational state of the aircraft engine is the first overall operational state; and
   directing a display of a second visual cue corresponding to a second pilot instruction when the overall operational state of the aircraft engine is the second overall operational state, the second pilot instruction being different than the first pilot instruction.

9. The method of claim 1, further comprising:
   directing a display of a first visual cue corresponding to an indication that the engine is operating normally when the overall operational state of the aircraft engine is the first overall state; and
   directing a display of a second visual cue corresponding to an indication that the engine is not operating normally when the overall operational state of the aircraft engine is the second overall operational state.

10. The method of claim 1 wherein directing the display of an icon includes directing the display of a graphical icon representative of the aircraft engine.

11. The method of claim 1 wherein directing the display of an icon includes directing the display of an icon having a shape representative of the aircraft engine.

12. The method of claim 1 wherein directing the display of an icon includes directing the display of text corresponding to an identity of the aircraft engine.

13. The method of claim 1 wherein directing a change in the display of the icon includes directing a change in a color of the icon.

14. The method of claim 1 wherein the icon includes text and wherein directing a change in the display includes directing a change in the text.

15. The method of claim 1 wherein directing a change in the display of the icon includes directing a change in a line thickness of the icon.

16. The method of claim 1 wherein directing a change in the display of the icon includes directing a change in a line intensity of the icon.

17. The method of claim 1 wherein directing a change in the display of the icon includes directing a change in a background shading of the icon.

18. The method of claim 1, further comprising directing the display of a text message in addition to the icon.

19. The method of claim 1, further comprising displaying a graphical representation of actual and available engine thrust in addition to the icon.

20. The method of claim 1, further comprising displaying the at least one engine operating parameter at least proximate to the icon.

21. The method of claim 1, further comprising displaying the at least one engine operating parameter at least proximate to the icon only when the at least one engine operating parameter is outside a particular range.

22. The method of claim 1, further comprising directing the display of a text message corresponding to the cause of the change from the first overall operational state to the second overall operational state.

23. The method of claim 1, further comprising directing the display of an informational text message corresponding to the state of the aircraft engine.

24. The method of claim 1 wherein the aircraft engine is a first aircraft engine and the icon is a first icon, and wherein the method further comprises:
    directing the display of a second icon that indicates an overall operational state of a second aircraft engine, the overall operational state of the second aircraft engine being determined from at least one engine operating parameter of the second aircraft engine; and
    directing a change in the display of the second icon when the overall operational state of the second aircraft engine changes from a third overall operational state to a fourth overall operational state.

25. The method of claim 1, further comprising:
    directing a change in the display of the icon when the overall operational state of the aircraft engine changes to a third overall operational state; and
    directing a change in the display of the icon when the overall operational state of the aircraft engine changes to a fourth overall operational state;
    wherein the aircraft engine is not running when the overall operational state is the first overall operational state, and wherein the aircraft engine is operating within normal limits when the overall operational state is the second state, further wherein the aircraft engine is operating with a malfunction that requires a reduction in aircraft engine power when the overall operational state is the third overall operational state, still further wherein the aircraft engine is operating with a malfunction that requires the aircraft engine to be shut down when the overall operational state is the fourth overall operational state.

26. The method of claim 1, further comprising maintaining a size of the icon to be at least approximately constant as the display of the icon is changed.

27. A computer-implemented method for displaying information corresponding to the operation of an aircraft engine, comprising:
    receiving a plurality of signals corresponding to a plurality of engine operating parameters;
    determining if the engine operating parameters are within corresponding ranges of values; and
    if all the engine operating parameters are within the corresponding ranges, directing the display of a single qualitative visual cue indicating an overall operational state of the aircraft engine.

28. The method of claim 27, further comprising directing a change in the display of the single visual cue when the overall operational state of the aircraft engine changes from a first overall operational state to a second overall operational state.

29. The method of claim 27 wherein the overall operational state is a first overall operational state, and wherein the method further comprises determining that the overall operational state of the aircraft engine is a second overall operational state if fewer than all the engine operating parameters are within the corresponding ranges.

30. The method of claim 27 wherein the single qualitative visual cue is a first visual cue corresponding to a first pilot instruction and wherein the method further comprises directing a display of a second visual cue corresponding to a second pilot instruction if the engine operating parameters are not within the corresponding ranges, the second pilot instruction being different than the first pilot instruction.

31. The method of claim 27 wherein directing the display of a visual cue includes directing a graphical display representative of the aircraft engine.

32. The method of claim 27 wherein the visual cue includes an icon representative of the aircraft engine, and wherein the method further comprises directing a change in the display of the icon when the overall operational state of aircraft engine changes from a first overall operational state to a second overall operational state, the change in the display including a change in a color of the icon.

33. The method of claim 27, further comprising directing the display of a text message corresponding to the cause of a change from a first overall operational state to a second overall operational state of the aircraft engine.

34. A computer-implemented method for displaying information corresponding to the operation of an aircraft engine, comprising:
    receiving at least one signal corresponding to at least one engine operating parameter;
    determining an overall operational state of an aircraft engine based at least in part on the at least one engine operating parameter; and
    directing the display of a single qualitative visual cue that indicates the overall operational state and the need for a crew action.

35. The method of claim 34 wherein directing the display of a single visual cue includes directing the display of an icon having a color correlated with a suggested response to the overall operational state of the aircraft engine.

36. The method of claim 34 wherein the at least one signal is one of a plurality of signals corresponding to plurality of engine operating parameters, and wherein the method further comprises:
    receiving the plurality of signals; and
    determining the overall operational state of the aircraft engine based at least in part on the plurality of signals.

37. The method of claim 34 wherein the at least one signal is one of a plurality of signals corresponding to a plurality of engine operating parameters, and wherein the method further comprises:
receiving the plurality of signals;
if all the engine operating parameters are within corresponding ranges, determining that the state the overall operational aircraft engine is a first overall operational state; and
if fewer than all the engine operating parameters are within the corresponding ranges, determining that the overall operational state of the aircraft engine is a second overall operational state.

38. The method of claim 34, further comprising:
directing a display of a first visual cue corresponding to a first pilot instruction if the at least one engine operating parameter is within a corresponding range of values; and
directing a display of a second visual cue corresponding to a second pilot instruction if the at least one engine operating parameter is not within the corresponding range, the second pilot instruction being different than the first pilot instruction.

39. The method of claim 34 wherein directing the display of a visual cue includes directing a graphical display representative of the aircraft engine.

40. The method of claim 34 wherein the visual cue includes an icon representative of the aircraft engine, and wherein the method further comprises directing a change in the display of the icon when the overall operational state of aircraft engine changes from a first overall operational state to a second overall operational state, the change in the display including a change in a color of the icon.

41. The method of claim 34, further comprising directing the display of a text message corresponding to the cause of a change from a first overall operational state to a second overall operational state of the aircraft engine.

42. A method for displaying information corresponding to the operation of an aircraft engine, comprising:
directing the display of an icon that indicates a qualitative overall operational state of the aircraft engine, the overall operational state being determined from at least one engine operating parameter;
directing a change in the display of the icon when the overall operational state of the aircraft engine changes from a first overall operational state to a second overall operational state; and
when the overall operational state of the aircraft engine is at least one of the first and second overall operational states, directing a display corresponding to a crew instruction.

43. The method of claim 42 wherein directing a display corresponding to a crew instruction includes directing the display of an icon having a color correlated with the crew instruction.

44. The method of claim 42 wherein directing a display corresponding to a crew instruction includes directing the display of an icon having a color correlated with a crew instruction to reduce power to the aircraft engine.

45. The method of claim 42 wherein directing a display corresponding to a crew instruction includes directing the display of an icon having a color correlated with a crew instruction to shut down the aircraft engine.

46. The method of claim 42 wherein directing a change in the display includes directing a change in a color of the display.

47. The method of claim 42, further comprising:
receiving a plurality of signals corresponding to a plurality of engine operating parameters;
if all the engine operating parameters are within corresponding ranges, determining that the overall operational state the aircraft engine is the first overall operational state; and
if fewer than all the engine operating parameters are within the corresponding ranges, determining that the overall operational state of the aircraft engine is the second overall operational state.

48. The method of claim 42 wherein directing the display of the icon includes directing a graphical display representative of the aircraft engine.

49. The method of claim 42, further comprising directing the display of a text message corresponding to the cause of a change from a first overall operational state to a second overall operational state of the aircraft engine.

50. A method for displaying aircraft engine information, comprising:
directing the display of an icon that indicates a qualitative overall operational state of an aircraft engine, the overall operational state being determined from a plurality of engine operating parameters; and
directing a change in the display of the icon when the overall operational state of the aircraft engine changes from a first overall operational state to a second overall operational state, wherein the change includes changing a color of the icon from a first color to a second color different than the first color.

51. The method of claim 50, further comprising:
if all the engine operating parameters are within corresponding parameter ranges, determining that the overall operational state of the aircraft engine is a first overall operational state; and
if fewer than all the engine operating parameters are within the parameter ranges, determining that the overall operational state of the aircraft engine is a second overall operational state.

52. The method of claim 50, further comprising:
directing a display of a first visual cue corresponding to a first pilot instruction if the engine operating parameters are within corresponding parameter ranges; and
directing a display of a second visual cue corresponding to a second pilot instruction if fewer than all the engine operating parameters are within the corresponding parameter ranges, the second pilot instruction being different than the first pilot instruction.

53. The method of claim 50 wherein directing the display of the icon includes directing a graphical display representative of the aircraft engine.

54. The method of claim 50, further comprising directing a change in the display of the icon when the overall operational state of aircraft engine changes from the first overall operational state to the second overall operational state, the change in the display including a change in a color of the icon.

55. The method of claim 50, further comprising directing the display of a text message corresponding to the cause of a change from the first overall operational state to the second overall operational state of the aircraft engine.

56. The method of claim 50 wherein in the aircraft engine is a first aircraft engine and the icon is a first icon, and wherein the method further comprises directing the display of a second icon indicating the overall operational state of a second aircraft engine.

57. A method for displaying aircraft engine information, comprising:
receiving signals corresponding to a plurality of engine operating parameters;
determining whether or not all the engine operating parameters are within corresponding parameter ranges;
directing the display of a graphical icon representing an aircraft engine and indicating a qualitative overall operational state of the aircraft engine, the overall operational state being determined from the plurality of engine operating parameters;
directing a change in the display of the icon when the overall operational state of the aircraft engine changes from a first overall operational state to a second overall operational state, wherein the change includes changing a color of the icon from a first color to a second color different than the first color, and wherein the engine is not running when the overall operational state is the first overall operational state, further wherein the engine is running within normal limits when the state is the second overall operational state;
changing a color of the icon to a third color when the overall operational state of the aircraft engine changes to a third overall operational state in which the aircraft engine is operating with a malfunction that requires a reduction in engine power; and
changing a color of the icon to a fourth color when the overall operational state of the aircraft engine changes to a fourth overall operational state in which the aircraft engine is operating with a malfunction that requires the aircraft engine to be shut down.

58. The method of claim 57 wherein changing the color from the first color to the second color includes changing the color from white to green, and wherein changing the color to the third color includes changing the color to amber, further wherein changing the color to the fourth color includes changing the color to red.

59. A computer-implemented method for displaying aircraft engine information, comprising:
directing the display of an icon that indicates a qualitative overall operational state of an aircraft engine, the overall operational state being determined from a plurality of engine operating parameters;
directing the display of an indication of thrust produced by the aircraft engine, the indication of thrust being different than the icon; and
directing a change in the display of the icon when the overall operational state of the aircraft engine changes from a first overall operational state to a second overall operational state.

60. The method of claim 59, further comprising:
if all the engine operating parameters are within corresponding parameter ranges, determining that the overall operational state the aircraft engine is the first overall operational state; and
if fewer than all the engine operating parameters are within the corresponding parameter ranges, determining that the overall operational state of the aircraft engine is the second overall operational state.

61. The method of claim 59, further comprising:
directing a display of a first visual cue corresponding to a first pilot instruction if all the engine operating parameters are within corresponding parameter ranges; and
directing a display of a second visual cue corresponding to a second pilot instruction if fewer than all the engine operating parameters are within the corresponding parameter ranges, the second pilot instruction being different than the first pilot instruction.

62. The method of claim 59 wherein directing the display of the icon includes directing a graphical display representative of the aircraft engine.

63. The method of claim 59, further comprising directing a change in the display of the icon when the overall operational state of aircraft engine changes from a first overall operational state to a second overall operational state, the change in the display including a change in a color of the icon.

64. The method of claim 59 wherein in the aircraft engine is a first aircraft engine and the icon is a first icon, and wherein the method further comprises directing the display of a second icon indicating an overall operational state of a second aircraft engine.

65. A computer-readable medium whose contents cause a computing device to display information corresponding to a qualitative overall operational state of an aircraft engine by performing a method, comprising:
directing the display of an icon that indicates the qualitative overall operational state of the aircraft engine, the overall operational state being determined from a plurality of engine operating parameters; and
directing a change in the display of the icon when the overall operational state of the aircraft engine changes from a first overall operational state to a second overall operational state.

66. The computer-readable medium of claim 65, the contents of which are further capable of:
receiving a plurality of signals corresponding to the plurality of engine operating parameters;
if all the engine operating parameters are within corresponding parameter ranges, determining that the overall operational state the aircraft engine is the first overall operational state; and
if fewer than all the engine operating parameters are within the corresponding parameter ranges, determining that the overall operational state of the aircraft engine is the second overall operational state.

67. The computer-readable medium of claim 65, the contents of which are further capable of:
directing a display of a first visual cue corresponding to a first pilot instruction if all the engine operating parameters are within corresponding parameter ranges; and
directing a display of a second visual cue corresponding to a second pilot instruction if fewer than all the engine operating parameters are within the corresponding parameter ranges, the second pilot instruction being different than the first pilot instruction.

68. The computer-readable medium of claim 65, the contents of which are further capable of directing the display of an icon having a graphical representation of the aircraft engine.

69. The computer-readable medium of claim 65, the contents of which are further capable of directing the display of an icon that includes text corresponding to an identity of the aircraft engine.

70. The computer-readable medium of claim 65, the contents of which are further capable of directing a change in the display of the icon when a state of aircraft engine changes from a first state to a second state, the change in the display including a change in a color of the icon.

71. The computer-readable medium of claim 65, the contents of which are further capable of directing the display of a text message corresponding to the cause of a change from the first overall operational state to the second overall operational state of the aircraft engine.

72. The computer-readable medium of claim 65 wherein the aircraft engine is a first aircraft engine and the icon is a first icon, and wherein the contents of the computer-readable medium are further capable of directing the display of a second icon indicating that a second aircraft engine is operating within selected ranges.

73. A computer system for displaying information corresponding to the operation of an aircraft engine, comprising:
    a determining component with contents capable of determining a qualitative overall operational state of the aircraft engine based on a plurality of engine operating parameters; and
    a display component with contents capable of displaying an icon indicating the overall operational state of the aircraft engine and changing a characteristic of the icon when the overall operational state of the aircraft engine changes from a first overall operational state to a second overall operational state.

74. The computer system of claim 73 wherein the determining component is further capable of:
    receiving a plurality of signals corresponding to the plurality of engine operating parameters; and
    determining the overall operational state of the aircraft engine based at least in part on the plurality of signals.

75. The computer system of claim 73 wherein the determining component is further capable of:
    receiving a plurality of signals corresponding to the plurality of engine operating parameters;
    if all the engine operating parameters are within corresponding parameter ranges, determining that the overall operational state the aircraft engine is the first overall operational state; and
    if fewer than all the engine operating parameters are within the corresponding parameter ranges, determining that the overall operational state of the aircraft engine is the second overall operational state.

76. The computer system of claim 73 wherein the display component is further capable of:
    displaying a first visual cue corresponding to a first pilot instruction if all the engine operating parameters are within the corresponding parameter ranges; and
    displaying a second visual cue corresponding to a second pilot instruction if fewer than all the engine operating parameters are within the corresponding parameter ranges, the second pilot instruction being different than the first pilot instruction.

77. A computer system for displaying information corresponding to the operation of an aircraft engine, comprising:
    determining means for determining a qualitative overall operational state of the aircraft engine based at least in part on a plurality of engine operating parameters; and
    display means for displaying an icon indicating the overall operational state of the aircraft engine and changing a characteristic of the icon when the overall operational state of the aircraft engine changes from a first overall operational state to a second overall operational state.

78. The computer system of claim 77 wherein the determining means are configured to receive a plurality of signals corresponding to the plurality of engine operating parameters and determine the overall operational state of the aircraft engine based at least in part on the plurality of signals.

79. The computer system of claim 77 wherein the determining means are configured to receive a plurality of signals corresponding to the plurality of engine operating parameters, and if all the engine operating parameters are within corresponding parameter ranges, determine that the overall operational state the aircraft engine is the first overall operational state, and if fewer than all the engine operating parameters are within the corresponding parameter ranges, determine that the overall operational state of the aircraft engine is the second overall operational state.

80. The computer system of claim 77 wherein the display means are configured to display a first visual cue corresponding to a first pilot instruction if all the engine operating parameters are within corresponding parameter ranges and display a second visual cue corresponding to a second pilot instruction if fewer than all the engine operating parameters are within the corresponding parameter ranges, the second pilot instruction being different than the first pilot instruction.

81. The computer system of claim 77 wherein the display means are configured to display a graphical representation of the aircraft engine.

82. The computer system of claim 77, wherein the display means are configured to change the display of the icon when the overall operational state of aircraft engine changes from the first overall operational state to the second overall operational state, the change in the display including a change in a color of the icon.

83. The computer system of claim 77, wherein the display means are configured to display a text message corresponding to the cause of a change from the overall operational first state to the second overall operational state of the aircraft engine.

84. The computer system of claim 77 wherein the aircraft engine is a first aircraft engine and the icon is a first icon, and wherein the display means are configured to display a second icon indicating an overall operational state of a second aircraft engine.

85. A computer-readable medium containing a data structure having information for display, the information when displayed including an icon that indicates a qualitative overall operating state of the aircraft engine, the icon having a characteristic that changes when the overall operational state of the aircraft engine changes from a first overall operational state to a second overall operational state, the characteristic of the icon being based on a plurality of engine operating parameters.

86. The computer-readable medium of claim 85 wherein the icon includes a graphical display representative of the aircraft engine.

87. The computer-readable medium of claim 85 wherein the icon has a shape representative of the aircraft engine.

88. The computer-readable medium of claim 85 wherein the characteristic of the icon that changes includes a color of the icon.

89. The computer-readable medium of claim 85 wherein the characteristic of the icon that changes includes a line thickness of the icon.

90. The computer-readable medium of claim 85 wherein the characteristic of the icon that changes includes in a line intensity of the icon.

91. The computer-readable medium of claim 85 wherein the characteristic of the icon that changes includes a background shading of the icon.

* * * * *